United States Patent
Johnson

Patent Number: 6,072,674
Date of Patent: *Jun. 6, 2000

[54] MOTOR CONTROLLER HAVING AUTOMATIC SWAPPED LEAD WIRING DETECTION CAPABILITY

[75] Inventor: Lynn Stewart Johnson, Aurora, Ill.

[73] Assignee: Siemens Energy & Automation, Inc., Alpharetta, Ga.

[*] Notice: This patent is subject to a terminal disclaimer.

[21] Appl. No.: 09/164,872

[22] Filed: Oct. 1, 1998

[51] Int. Cl.[7] .................................................. H02H 3/28
[52] U.S. Cl. .............................. 361/23; 361/88; 318/490; 324/522; 324/722
[58] Field of Search .................................. 361/23, 30, 21, 361/86, 88, 90, 91.1, 91.2, 78, 79; 340/660, 661; 323/282, 285; 318/490, 34, 519; 324/522, 629, 647, 772, 521

[56] References Cited

U.S. PATENT DOCUMENTS

| | | | |
|---|---|---|---|
| 4,140,950 | 2/1979 | Volk, Jr. | 318/749 |
| 4,492,878 | 1/1985 | Hamel | 307/127 |
| 5,469,351 | 11/1995 | Masrur et al. | 363/56 |
| 5,477,412 | 12/1995 | Neiger et al. | 361/45 |
| 5,563,489 | 10/1996 | Murry | 318/778 |
| 5,574,346 | 11/1996 | Chavan et al. | 318/434 |
| 5,894,392 | 4/1999 | McDonald | 361/42 |

*Primary Examiner*—Jeffrey Gaffin
*Assistant Examiner*—Kim Huynh

[57] ABSTRACT

Problems associated with delta motors being subjected to increased torques and overcurrent conditions resulting from inaccurate swapped wiring configurations in a delta motor system are eliminated in a motor controller that automatically inhibits operation of the delta motor when it detects that the fault contactor connections and the motor controller connections to a delta motor have been swapped or reversed.

13 Claims, 7 Drawing Sheets

MOTOR CONTROLLER HAVING AUTOMATIC SWAPPED LEAD WIRING DETECTION CAPABILITY

FIELD OF THE INVENTION

This invention relates to motor controllers, and more particularly, to a controller for a delta motor that automatically detects when the motor controller switch connections and the fault switching device connections to a delta motor have been swapped.

BACKGROUND OF THE INVENTION

A delta motor system typically includes a delta motor, a three phase power source, a fault contactor and a motor controller. During start up, delta motors often experience potentially damaging high inrush currents and starting torques. This can adversely effect the performance of the motor drive and increase general wear and tear leading to higher maintenance costs. In addition, current peaks during motor startup can also cause voltage disturbances in the power supply.

Motor controllers are typically used to restrict the motor torque and reduce the high starting currents by controlling the application of voltage from the three phase power source to the delta motor. The motor controller generally includes a set of three control switches that are connected between the line voltage terminals of the three phase power source and the windings of the delta motor. The motor controller regulates the voltage from the three phase power source to the delta motor by selectively opening and closing the three control switches. The proper operation of the delta motor is dependent on the proper regulation of the control switches.

The fault contactor is commonly used to disconnect the three phase power source from the delta motor in the event that the delta motor system malfunctions. The fault contactor includes a set of three contacts that are also connected between each of the delta motor windings and the line voltage terminals. Each of the delta motor windings are adapted to receive the fault contact connection on one side and the control switch connection on the other side. Alternatively, the fault contactor function can be performed by a shunt trip circuit breaker, in-line contactor, or fuses.

The motor controller's internal timing mechanisms are specifically designed to regulate the application of specific line voltages from the three phase power source to specific delta motor windings based on a predesignated wiring configuration. Conventional electrical leads are typically used to connect the delta motor windings to the control switches and to the fault contacts. Since the electrical leads providing connection to the delta motor terminals are not always clearly marked, mistakes in wiring the delta motor system are common.

A common wiring error occurs when the delta motor terminals designated for connection to the motor controller control switches are connected to the fault contacts and the motor terminals designated for connection to the fault contacts are connected to the control switches. In this wiring configuration, the phase shift in the currents through each of the windings are no longer compatible with motor controller's internal mechanisms and although the delta motor will run, the motor controller will be unable to perform its necessary current limiting functions during start up or will be unable to supply full voltage to the motor for operation after starting.

Clearly it would be desirable to use a motor controller that automatically detects a fault condition when the fault contactor connections and the motor controller connections to a delta motor's windings have been swapped prior to actually running the delta motor 14. This will enable the user to correct the wiring error before starting the delta motor and subjecting it to potentially damaging overcurrent and increased torque conditions which can adversely effect the performance of the motor drive and increase general wear and tear leading to higher maintenance costs. The present invention seeks to achieve these objectives.

SUMMARY OF THE INVENTION

It is a principal object of this invention to provide a new and improved motor controller that automatically detects when the delta motor connections to the fault switching means and to the motor controller control switches have been swapped. More specifically, it is an object of the invention to provide a motor controller that detects the fault condition prior to operating the delta motor so that the wiring can be corrected and the delta motor is never exposed to the potentially damaging high inrush currents and increased motor torque which can adversely effect the performance of the motor drive and increase general wear and tear leading to higher maintenance costs.

An exemplary embodiment of the invention achieves the foregoing object in a motor controller for use in a motor system that includes a multiphase power source having three supply lines, a delta motor having three windings, each winding having a first lead and a second lead and a plurality of fault switching means. The plurality of fault switching means are intended to be connected between selected supply lines and the first lead of selected windings.

In one embodiment, the motor controller includes a plurality of control switching means and an error detecting means. Each of the control switching means is intended to be connected between selected supply lines and with the second leads of selected windings. The error detecting means is connected across each of the individual control switching means and is operable to detect a fault condition if the first winding leads intended for connection to the fault switching means are connected to the control switching means and the second winding leads intended for connection to the control switching means are connected to the fault switching means. An indicating means may be connected to the error detecting means for generating a fault indication in response to the fault condition.

In another embodiment, the motor controller includes a plurality of control switching means and an error detecting means. Each of the control switching means is intended to be connected in the selected supply lines. The error detecting means is connected across each of the individual control switching means and is operable to detect a fault condition if the first winding leads intended for connection to the fault switching means are connected to the control switching means and the second winding leads intended for connection to the control switching means are connected to the fault switching means. An indicating means may be connected to the error detecting means for generating a fault indication in response to the fault condition.

In one embodiment, the plurality of switching means are solid state devices.

In another embodiment, the plurality of switching means are triacs or SCRs.

In another form of the invention, the error detecting means may include a sensing means that is connected across the individual control switching means and generates a plurality of outputs representative of the voltages across each of the control switching means and of the voltages across the first and second supply lines, the second and third supply lines and the third and first supply lines.

The error detecting means may also include a decoding means, connected to the sensing means, for detecting the fault condition. The decoding means identifies the fault condition if the voltage across the first control switching means and the voltage across the first and third supply lines are synchronously both greater than or less than zero and the voltage across the second control switching means and the voltage across the second and first supply lines are synchronously both greater than or less than zero and the voltage across the third control switching means and the voltage across the third and second supply lines are synchronously both greater than or less than zero.

Other objects and advantages of the invention will become apparent from the following specification taken in conjunction with the accompanying drawings.

DETAILED DESCRIPTION OF THE DRAWINGS

Figure 1:
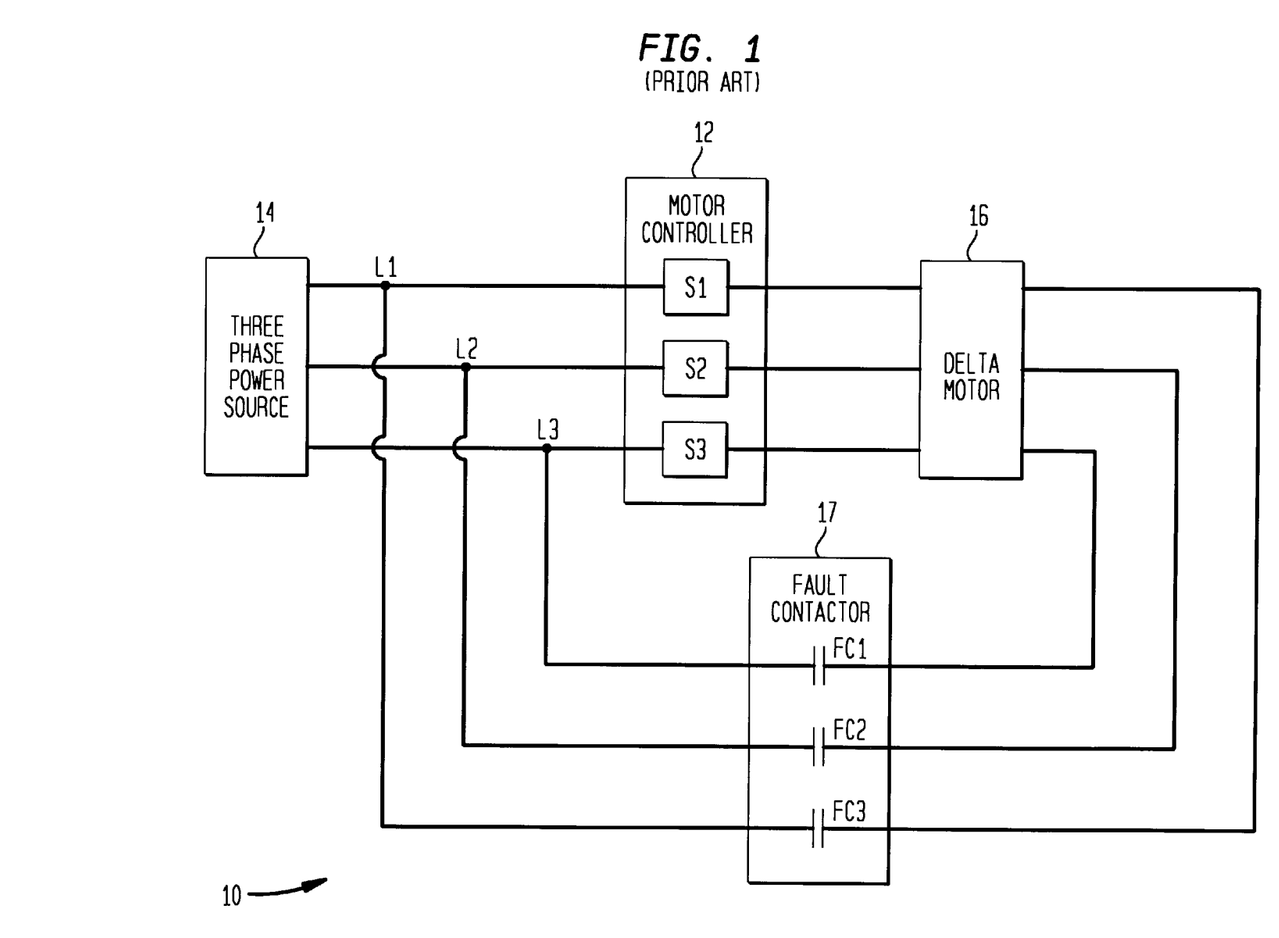
FIG. 1 shows a delta motor system including a prior art motor controller.

A diagram of a conventional delta motor system 10 including a prior art motor controller 12 is depicted in FIG. 1. The delta motor system 10 typically consists of a three phase power source 14, a delta motor 16, a fault contactor 17 and a motor controller 12. The motor controller 12 generally includes a set of three control switches S1, S2, S3 for providing electrical connection between the line voltage terminals L1, L2, L3 of the three phase power source 14 and the delta motor 16. The motor controller 12 regulates the voltage applied to the delta motor 16 by selectively opening and closing the three control switches S1, S2, S3. The proper operation of the delta motor 16 is dependent upon the proper regulation of the control switches S1, S2, S3.

The fault contactor 17 also includes a set of three contacts FC1, FC2, FC3 that, in a preferred embodiment, are connected between line voltage terminals L1, L2, L3 and the delta motor 16. Alternatively, the fault contactor 17 may be connected between line voltage terminals L1, L2, L3 and the controller 12, as is known. The fault contactor 17 is used to disconnect the three phase power source 14 from the delta motor 16 in the event that the delta motor system 10 experiences a malfunction.

Figure 2:
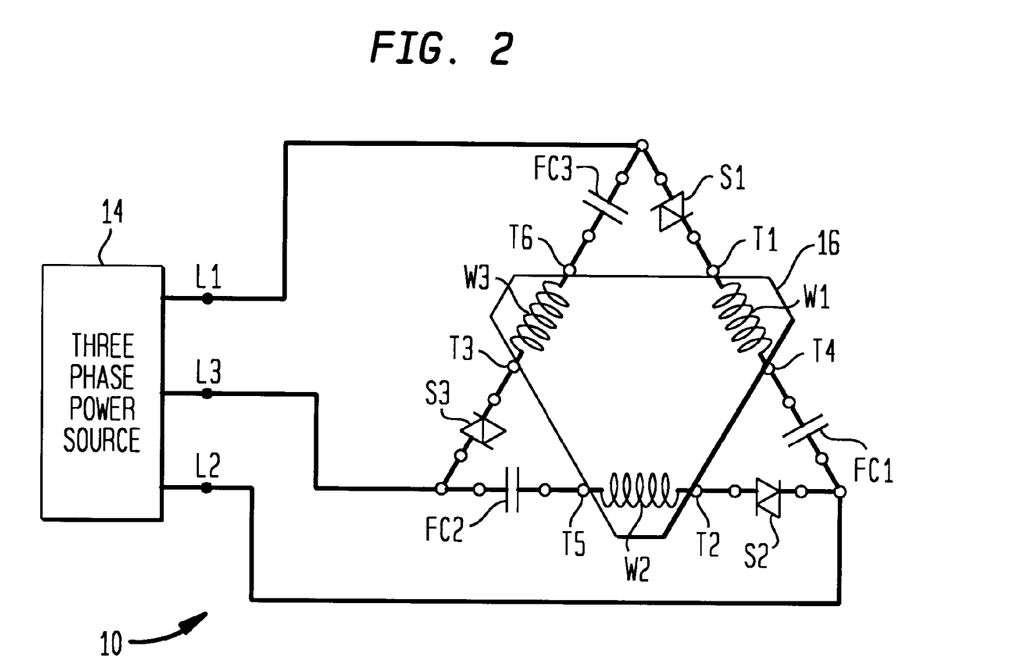
FIG. 2 illustrates the relationships between the delta motor windings, the motor controller control switches and the fault contactor contacts necessary for proper motor controller operation.

FIG. 2 illustrates in detail the necessary relationships between the delta motor windings W1, W2, W3, the line voltage terminals L1, L2, L3, the fault contacts FC1, FC2, FC3 and the motor controller control switches S1, S2, S3 for proper motor controller operation. The motor controller's internal timing mechanisms are specifically designed to regulate the application of the three phase voltage from the three phase power source 14 to the delta motor windings W1, W2, W3 based on a predesignated wiring configuration.

The delta motor 16 consists of three windings W1, W2, W3 arranged in a delta configuration. Each winding W1, W2, W3 has a pair of associated motor terminals T1 and T4, T2 and T5, T3 and T6 respectively, that provide electrical connection to either side of each individual winding W1, W2, W3. Terminals T1, T2 and T3 are designated for connection to line voltage terminals L1, L2 and L3 respectively using the control switches S1, S2 and S3 respectively. Terminals T4, T5 and T6 are designated for connection to line voltage terminals L2, L3 and L1 respectively using fault contacts FC1, FC2 and FC3 respectively.

The overall layout of the control switches and the windings can be described as follows: control switch S1, winding W1, fault contact FC1 are connected in series across line voltage terminals L1 and L2; control switch S2, winding W2, and fault contact FC2 are connected in series across line voltage terminals L2 and L3; and control switch S3, winding W3, and FC3 are connected in series across line voltage terminals L3 and L1. It is essential that the motor terminals T1, T2, T3, T4, T5, T6 be wired with the appropriate control switches S1, S2, S3 and the appropriate fault contacts FC1, FC2, FC3 across the appropriate line voltage terminals L1, L2, L3 to enable the motor controller 12 to perform its motor torque restricting and current limiting functions.

Conventional leads are typically used to connect the delta motor windings W1, W2, W3 to the control switches S1, S2, S3 and to the fault contacts FC1, FC2, FC3. The electrical leads providing connection to the delta motor terminals T1, T2, T3, T4, T5 and T6 are not always clearly marked. As a result wiring mistakes during the installation process of the delta motor system 10 are common.

Figure 3:
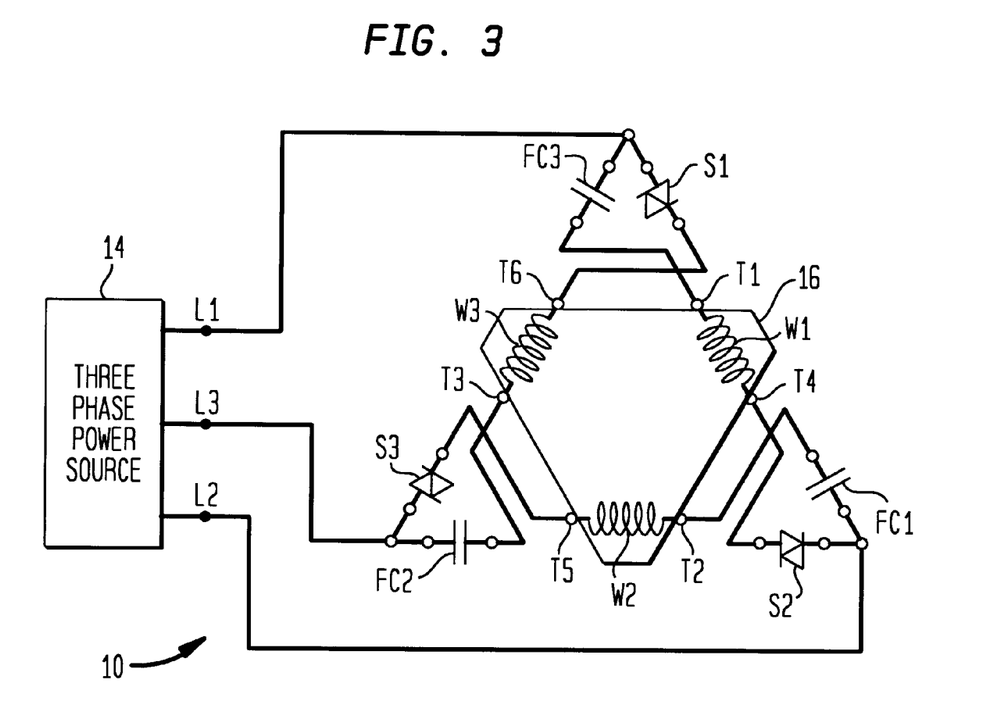
FIG. 3 shows a delta motor system wiring configuration where the fault contactor connections and the motor controller switch connections to a delta motor's windings have been swapped.

A particularly common wiring error, where connections to the fault contact terminals T4, T5, T6 of the delta motor 16 and connections to the control switch terminals T1, T2, T3 of the delta motor 16 have been swapped, is illustrated in FIG. 3. Specifically, the delta motor terminals T4, T5 and T6 designated for connection to the fault contacts FC1, FC2 and FC3 have been connected to the control switches S2, S3 and S1 respectively and the winding terminals T1, T2 and T3 designated for connection to the control switches S1, S2 and S3 have been connected to the fault contacts FC3, FC1 and FC2 respectively. In this wiring configuration, the phase shift in the currents flowing through each of the windings W1, W2, W3 are no longer be compatible with the motor controller's internal timing mechanisms and although the delta motor 16 will still run under these conditions, the motor controller 12 will be unable to perform its necessary current limiting functions during start up.

Figure 4:
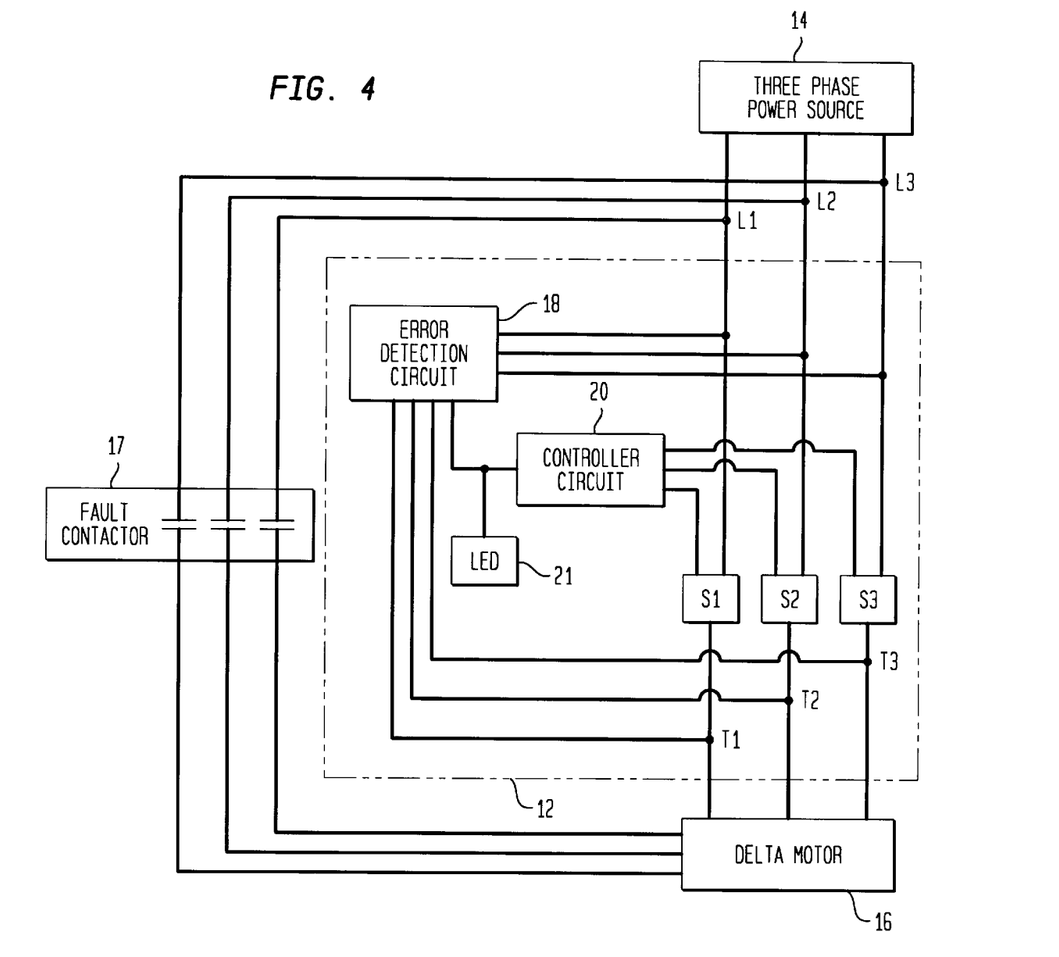
FIG. 4 depicts the motor controller according to the invention connected within a delta motor system.

An overview of the motor controller 12, according to the invention, as wired within a delta motor system 10 is depicted in FIG. 4. The motor controller 12 includes an innovative error detection circuit 18. The error detection circuit 18 is an integral part of the motor controller 12 and is electrically coupled to the line voltage terminals L1, L2, L3 and to the motor terminals T1, T2, T3 across each of the individual control switches S1, S2, S3. The error detection circuit 18 manipulates the voltage readings obtained from the line voltage terminals L1, L2, L3 and the motor terminals T1, T2, T3 prior to starting the delta motor 16 to determine if the control switch connections and the fault contacts connections to the delta motor terminals leads have been inadvertently swapped and generates a fault signal in response to detecting such a condition.

The controller circuit 20, connected to each of the control switches S1, S2, S3 and the error detection circuit 18, controls the application of voltages from the three phase power source 14 to the delta motor 16 by controlling the operation of the control switches S1, S2, S3. The controller circuit 20 responds to the fault signal generated by the error detection circuit 18 by inhibiting operation of the delta motor 16. In addition, the error detection circuit 18 also directs the fault signal to an indicator circuit, such as for example an LED 21, that provides the user with notice of the swapped leads wiring error.

Solid state switches such as SCRs or triacs are used to perform the control switch S1, S2, S3 functions in a preferred embodiment of the invention, however, the use of alternative switching mechanisms are also considered to be within the scope of the invention. In addition, in the illustrated embodiment, the controller circuit 20 comprises a programmed microcontroller. It should be noted that alternative hardware or software implementations of the controller circuit 20 are also within the spirit of the invention.

Figure 5:
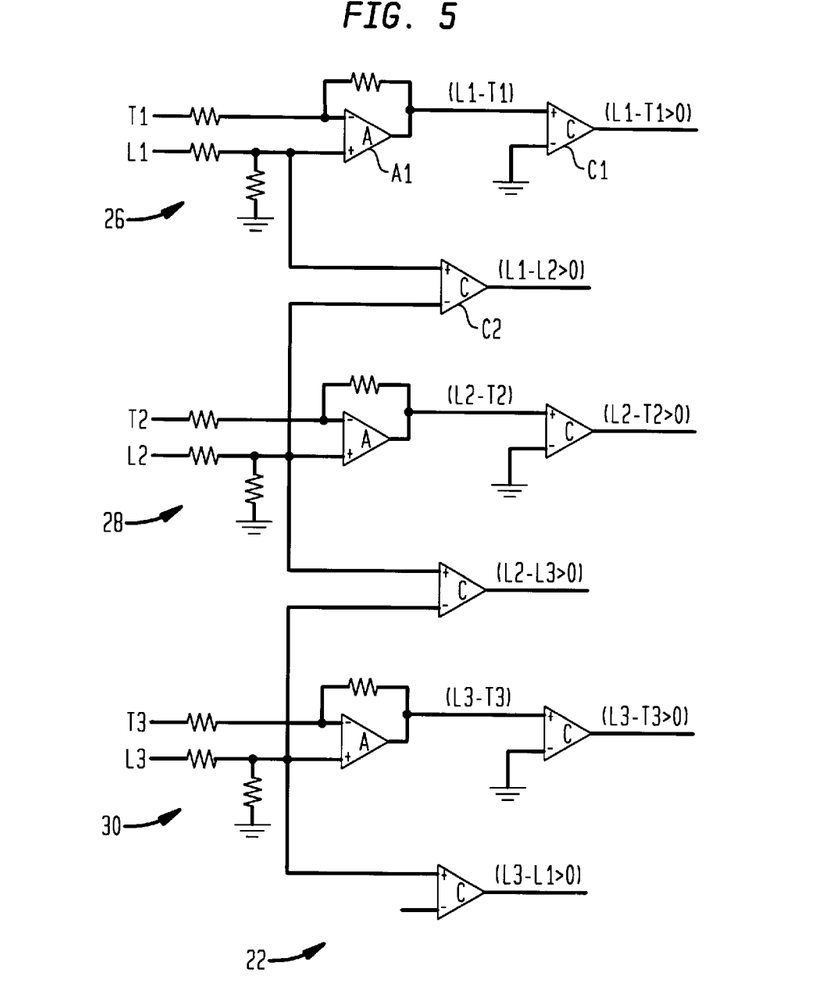
FIG. 5 is a schematic representation of the sensing circuit.
Figure 6:
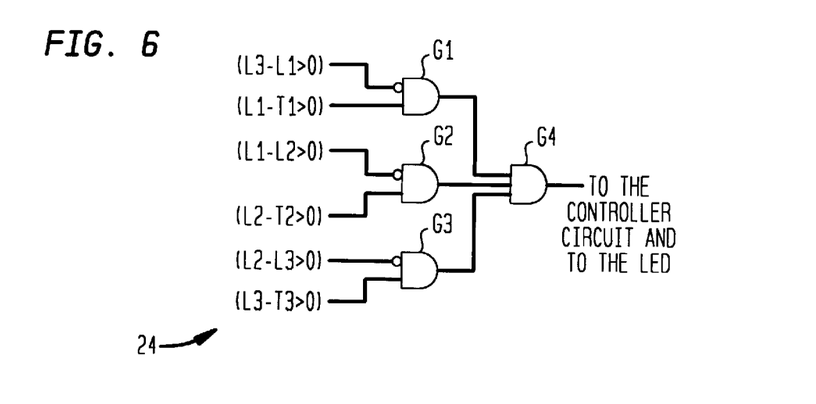
FIG. 6 is a schematic representation of the decoding circuit.

The error detection circuit 18 includes a sensing circuit 22, shown in FIG. 5 and a decoding circuit 24, shown in FIG. 6. The sensing circuit 22 accepts the three line voltages L1, L2, L3 and the three voltages at the three motor terminals designated for control switch connections T1, T2, T3 as inputs and generates a true signal for each of the following conditions that are found to be true:

Line to Line Voltages
Voltage (L1–L2)>0
Voltage (L2–L3)>0
Voltage (L3–L1)>0
Voltages Across Control Switches
Voltage (L1–T1)>0
Voltage (L2–T2)>0
Voltage (L3–T3)>0

The sensing circuit 22 consists of three similar subcircuits 26, 28, 30. The first subcircuit 26 consists of an amplifier A1 and two comparators C1, C2. The amplifier A1 accepts the voltage at motor terminal T1 at its negative input and the line voltage at terminal L1 at its positive input and generates the difference between the two (L1–T1) as its output. This output (L1–T1) is directed into the positive input of the first comparator C1 and the negative input is connected to a ground signal. The comparator C1 compares the input signal (L1–T1) to the ground signal and generates a true signal when (L1–T1), the voltage across control switch S1, is greater than zero. The second comparator C2 accepts the line voltage at terminal L1 as its positive input and the line voltage at terminal L2 as its negative input and generates a true signal when the line to line voltage (L1–L2) is greater than zero.

The second and third subcircuits 28, 30 operate similarly. The second subcircuit 28 accepts the voltage at motor terminal T2 and the line voltages at terminals L2 and L3 as inputs and generates a first true signal when (L2–T2), the voltage across control switch S2, is greater than zero and a second true signal when the line to line voltage (L2–L3) is greater than zero. Similarly, the third subcircuit 30 accepts the voltage at motor terminal T3 and the line voltages at terminals L3 and L1 as inputs and generates a first true signal when (L3–T3), the voltage across the control switch S3, is greater than zero and a second true signal when the line to line voltage (L3–L1) is greater than zero.

The decoding circuit 24 accepts the digital output signals generated by the sensing circuit 22 and issues a true signal when the swapped leads configuration is detected. The decoding circuit 24 consists of four logical AND gates G1, G2, G3, G4. The first AND gate G1 accepts two signals as inputs: the inverse of the signal indicating if the line to line voltage (L3–L1) is greater than zero and the signal indicating if the voltage across the first control switch (L1–T1 ) is greater than zero and issues a true signal at its output when both inputs are true.

Similarly, the second AND gate G2 accepts the inverse of the signal indicating if the line to line voltage (L1–L2) is greater than zero and the signal indicating if the voltage across the second control switch (L2–T2) is greater than zero and generates a true signal as an output when both conditions are true. The third AND gate G3 also performs a similar comparison accepting the inverse of the signal for the line to line voltage (L2–L3) and the signal associated with the voltage across the third control switch (L3–T3) as inputs.

The fourth AND gate G4 accepts the outputs issued by the three AND gates G1, G2, G3 and generates a true signal or a fault signal when all three of the inputs are high indicating that in wiring the delta motor system 10, the delta motor fault contact leads have been swapped with delta motor control switch leads. The fault signal is then directed to the controller circuit 20 and the LED 21. In a preferred embodiment of the invention, the logical functions shown in the decoding circuit 24 are performed by the microcontroller that implements the functions of the controller circuit 20. While the illustrated embodiment focuses on a particular implementation of the error detection circuit, other equivalent hardware and software implementations of the logic disclosed also fall within the scope of the invention.

Figure 7A:
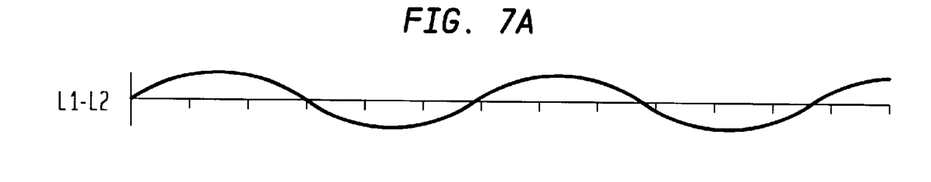
FIGS. 7A–7F illustrate the waveforms for the line to line voltages and the digital signals representative of the voltages across the individual control switches for a correctly wired delta motor system.
Figure 7B:
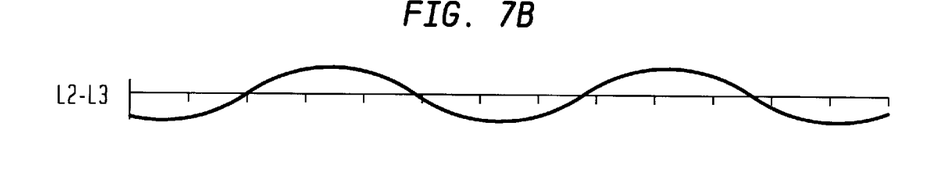
Figure 7C:
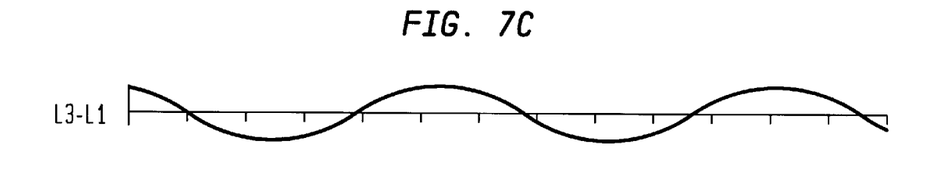
Figure 7D:
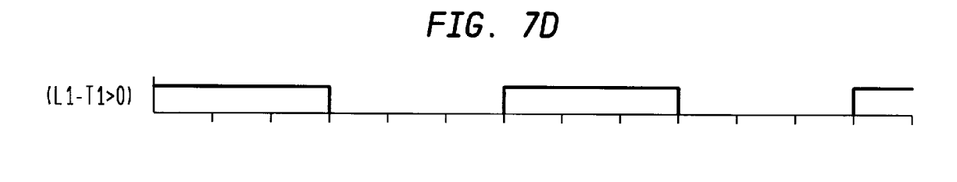
Figure 7E:
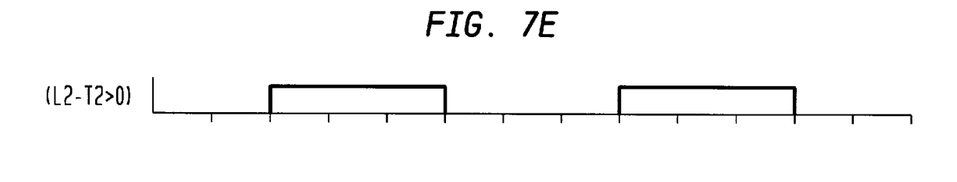
Figure 7F:
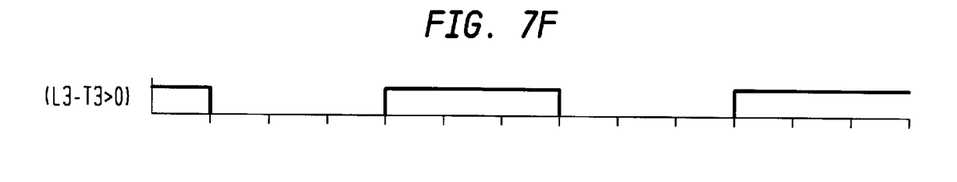

FIG. 7 illustrates the waveforms for the line to line voltages (L1–L2), (L2–L3) and (L3–L1) and the digital signals showing when each of the voltages across the control switches (L1–T1), (L2–T2), (L3–T3) are greater than zero for a correctly wired delta motor system 10. The following observations can be made when the delta system 10 is correctly configured for operation:

(i) the first control switch S1 is connected across line voltage terminals L1 and L2 and the voltage across the first control switch (L1–T1), shown in FIG. 7(d), and the line to line voltage (L1–L2), shown in FIG. 7(a), are synchronously greater than zero (ii) the second control switch S2 is connected across line voltage terminals L2 and L3 and the voltage across the second control switch (L2–T2), shown in FIG. 7(e), and the line to line voltage (L2–L3), shown in FIG. 7(b), are synchronously greater than zero (iii) the third control switch S3 is connected across line voltage terminals L3 and L1 and the voltage across the third control switch (L3–T3), shown in FIG. 7(f), and the line to line voltage (L3–L1), shown in FIG. 7(c), are synchronously greater than zero.

Figure 8A:
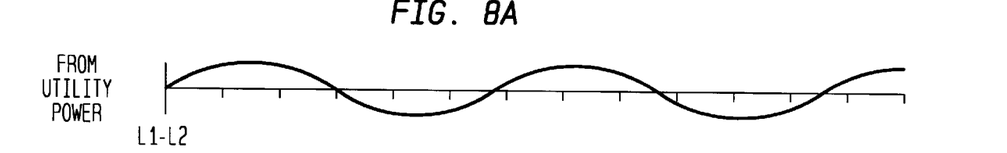
FIGS. 8A–8F illustrate the waveforms for the line to line voltages and the digital signals representative of the voltages across the individual control switches for a delta motor system where the fault contact connections and the control switch connections to the delta motor have been swapped.
Figure 8B:
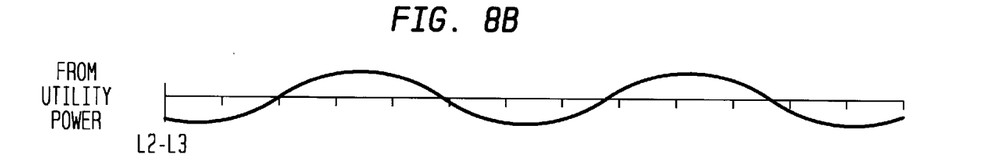
Figure 8C:
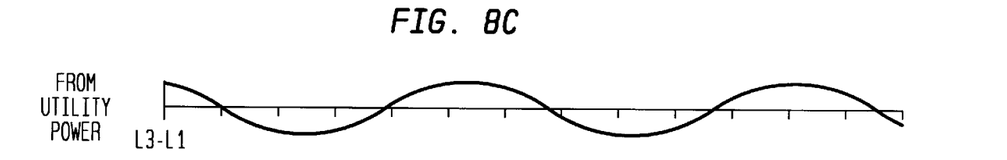
Figure 8D:
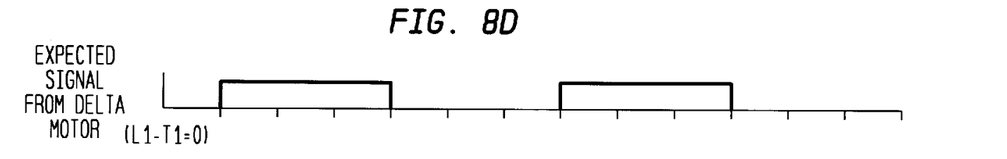
Figure 8E:
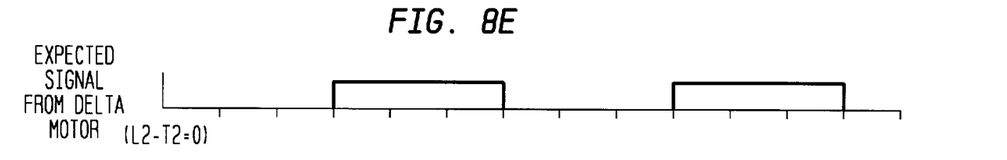
Figure 8F:
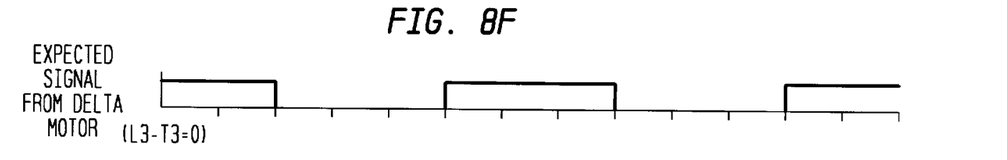

When the delta motor system 10 is configured in the swapped wiring configuration, the relationships observed above are altered. FIG. 8 illustrates the waveforms for the line to line voltages (L1–L2), (L2–L3), (L3–L1) and the digital signals representative of the voltages across the individual control switches (L1–T1), (L2–T2), (L3–T3) for a delta motor system 10 where the fault contact connections and the control switch connections to the delta motor 16 have been swapped. These changes, described below, are used by the decoding circuit 24 to identify the incorrect wiring configuration:

(i) the first control switch S1 is connected across line voltage terminals L1 and L3 and the voltage across the first control switch (L1–T1), shown in FIG. 8(d), and the inverse of the line to line voltage (L3–L1), shown in FIG. 8(c), are synchronously greater than zero;

(ii) the second control switch S2 is connected across line voltage terminals L2 and L1 and the voltage across the second control switch (L2–T2), shown in FIG. 8(e), and the inverse of the line to line voltage (L1–L2), shown in FIG. 8(a), are synchronously greater than zero;

(iii) the third control switch S3 is connected across line voltage terminals L3 and L2 and the voltages across the third control switch (L3–T3), shown in FIG. 8(f), and the inverse of the line to line voltage (L2–L3), shown in FIG. 8(b), are synchronously greater than zero.

The motor controller 12 uses the error detection circuit 18 to identify if the delta motor system 10 is wired in a swapped wiring configuration. Upon detection of such a condition, the error detection circuit 18 generates a fault signal that is routed to an LED 21 to provide warning of the faulty wiring to the user and to the controller circuit 20 which in turn inhibits operation of the delta motor 16. It will be appreciated that since the entire error detection process occurs prior to actually turning on the delta motor 16, the delta motor 16 is never exposed to potentially damaging increased motor torque and overcurrent conditions.

The foregoing disclosure of specific embodiments is intended to be illustrative of the broad concepts comprehended by the invention.

I claim:

1. For use in a motor system including a multiphase power source having three supply lines, a delta motor having three windings, each winding having a first lead and a second lead and a plurality of fault switching means intended for connection between selected supply lines and the first lead of selected windings, a motor controller comprising:

a plurality of control switching means intended for connection between selected supply lines and the second lead of selected windings; and an error detecting means connected across each of the control switching means and operable to detect a fault condition if the first winding leads intended for connection to the fault switching means are inadvertently connected to the control switching means and the second winding leads intended for connection to the control switching means are inadvertently connected to the fault switching means.

2. The motor controller according to claim 1, including an indicating means connected to the error detecting means for generating a fault indication in response to the fault condition.

3. The motor controller according to claim 1, wherein the plurality of control switching means comprise solid state devices.

4. The motor controller according to claim 1, wherein the plurality of control switching means comprise SCRs.

5. The motor controller according to claim 1, wherein the plurality of control switching means comprise triacs.

6. For use in a motor system including a multiphase power source having first, second and third supply lines, a delta motor having first, second and third windings, each winding having a first lead and a second lead and first, second and third fault switching means, where the first fault switching means is intended for connection between the first lead of the first winding and the second supply line, the second fault switching means is intended for connection between the first lead of the second winding and the third supply line and the third fault switching means is intended for connection between the first lead of the third winding and the first supply line, a motor controller comprising:

a first control switching means intended for connection between the first supply line and the second lead of the first winding;

a second control switching means intended for connection between the second supply line and the second lead of the second winding;

a third control switching means intended for connection between the third supply line and the second lead of the third winding; and an error detecting means connected across each of the switching means and operable to detect a fault condition if the first winding leads intended for connection with third, first and second fault switching means are inadvertently connected to the first, second and third control switching means respectively and the second winding leads intended for connection with the first, second and third control switching means are inadvertently connected to the third, first and second fault switching means respectively.

7. The motor controller according to claim 6, including an indicating means connected to the error detecting means for generating a fault indication in response to the fault condition.

8. The motor controller according to claim 6, wherein the error detection circuit further comprises a sensing means connected across the control switching means and operable to generate a plurality of outputs representative of the voltages across each of the control switching means and of the voltages across the first and second supply lines, the second and third supply lines and the third and first supply lines.

9. The motor controller according to claim 8, wherein the error detecting means further comprises a decoding means connected to the sensing means for detecting the fault condition if the voltage across the first control switching means and the voltage across the first and third supply lines are synchronously greater than zero and the voltage across the second control switching means and the voltage across the second and first supply lines are synchronously greater than zero and the voltage across the third control switching means and the voltage across the third and second supply lines are synchronously greater than zero.

10. The motor controller according to claim 6, wherein the control switching means comprise solid state devices.

11. The motor controller according to claim 6, wherein the control switching means comprise SCRs.

12. The motor controller according to claim 6, wherein the control switching means comprise triacs.

13. For use in a motor system including a multiphase power source having first, second and third supply lines, a delta motor having first, second and third windings, each having a first lead and a second lead, and first, second and third fault switching means, where the first fault switching means is intended for connection between the first lead of the first winding and the second supply line, the second fault switching means is intended for connection between the first lead of the second winding and the third supply line and the third fault switching means is intended for connection between the first lead of the third windings and the first supply line, a motor controller comprising:
- a first control switching means intended for connection between the first supply line and the second lead of the first winding;
- a second control switching means intended for connection between the second supply line and the second lead of the second winding;
- a third control switching means intended for connection between the third supply line and the second lead of the third winding;
- a sensing means connected across each of the control switching means and operable to generate a plurality of outputs representative of the voltages across each of the control switching means and of the voltages across the first and second supply lines, the second and third supply lines and the third and first supply lines;
- a decoding means connected to the sensing means for detecting the fault condition if the voltage across the first control switching means and the voltage across the first and third supply lines are synchronously greater than zero and the voltage across the second control switching means and the voltage across the second and first supply lines are synchronously greater than zero and the voltage across the third control switching means and the voltage across the third and second supply lines are synchronously greater than zero; and
- an indicating means connected to the decoding means and operable to generate a fault indication in response to the fault condition.

* * * * *